(12) United States Patent
Sugimoto et al.

(10) Patent No.: US 7,664,471 B2
(45) Date of Patent: Feb. 16, 2010

(54) WIRELESS TRANSCEIVER AND METHOD FOR PRODUCING THE SAME

(75) Inventors: Keiichi Sugimoto, Kariya (JP); Mitsuru Nakagawa, Chiryu (JP)

(73) Assignee: Denso Corporation, Kariya (JP)

( * ) Notice: Subject to any disclaimer, the term of this patent is extended or adjusted under 35 U.S.C. 154(b) by 566 days.

(21) Appl. No.: 11/411,151

(22) Filed: Apr. 26, 2006

(65) Prior Publication Data
US 2006/0246851 A1 Nov. 2, 2006

(30) Foreign Application Priority Data
Apr. 27, 2005 (JP) ............................ 2005-130273

(51) Int. Cl.
*H04B 1/38* (2006.01)
(52) U.S. Cl. .................. 455/90.3; 455/347; 248/309.1; 248/316.8; 312/7.1
(58) Field of Classification Search ................. 455/90.3
See application file for complete search history.

(56) References Cited

U.S. PATENT DOCUMENTS

| | | | | |
|---|---|---|---|---|
| 3,643,764 A * | 2/1972 | Maurice | ..................... | 188/71.8 |
| 4,365,731 A * | 12/1982 | Fehling et al. | .............. | 222/600 |
| 5,117,097 A * | 5/1992 | Kimura et al. | .............. | 235/439 |
| 5,632,168 A * | 5/1997 | Yano | ......................... | 70/278.3 |
| 5,768,925 A * | 6/1998 | Ozawa et al. | ................. | 70/408 |
| 5,963,628 A * | 10/1999 | Cheng et al. | ................ | 379/145 |
| 6,035,677 A * | 3/2000 | Janssen et al. | ............. | 70/278.3 |
| 6,050,118 A * | 4/2000 | Kito | ......................... | 70/456 R |
| 6,143,385 A * | 11/2000 | Furuya et al. | .............. | 428/36.9 |
| 6,164,101 A * | 12/2000 | Kito et al. | ................... | 70/278.3 |
| 6,367,298 B1 * | 4/2002 | Janssen et al. | ............. | 70/278.3 |
| 6,373,511 B1 * | 4/2002 | Groves et al. | .............. | 347/198 |
| 6,427,504 B1 * | 8/2002 | Janssen et al. | ............. | 70/278.3 |
| 6,457,337 B1 * | 10/2002 | Hattick et al. | .............. | 70/278.3 |
| 6,856,053 B2 * | 2/2005 | LeFlem et al. | ................ | 310/54 |
| 6,948,344 B2 * | 9/2005 | Janssen | ..................... | 70/278.3 |
| 7,017,822 B2 * | 3/2006 | Aisenbrey | .................... | 235/487 |
| 7,041,924 B2 * | 5/2006 | Jeschke et al. | ........... | 200/302.2 |

(Continued)

FOREIGN PATENT DOCUMENTS

DE 40 34 727 5/1992

(Continued)

OTHER PUBLICATIONS

German Office Action dated Nov. 17, 2008 for corresponding DE Application No. 102006018907.8-31, with translation.

(Continued)

*Primary Examiner*—Duc Nguyen
*Assistant Examiner*—Hai V Nguyen
(74) *Attorney, Agent, or Firm*—Nixon & Vanderhye P.C.

(57) ABSTRACT

A wireless transceiver includes a mechanical key, a resin case having a hollow space that accepts the mechanical key and a reinforcement for reinforcing the resin case. The hollow space in the resin case is defined by a combination of a thin wall and a thick wall, and the resin case has the reinforcements made from a thin metal plate in the hollow space at two positions spaced by a predetermined length along a longitudinal direction of the mechanical key being accepted therein. Each of the reinforcements bridges the thin wall and the thick wall that is adjacent to the thin wall.

12 Claims, 5 Drawing Sheets

U.S. PATENT DOCUMENTS

| | | | |
|---|---|---|---|
| 7,046,136 B2 * | 5/2006 | Sugimoto et al. | 340/539.1 |
| 7,068,223 B2 * | 6/2006 | Yoshida et al. | 343/700 MS |
| 7,142,413 B2 * | 11/2006 | Sugimoto et al. | 361/679 |
| 7,166,812 B2 * | 1/2007 | White et al. | 200/341 |
| 7,187,266 B2 * | 3/2007 | Hasegawa et al. | 340/5.62 |
| 7,212,889 B2 * | 5/2007 | Mann et al | 701/1 |
| 7,242,278 B2 * | 7/2007 | Sugimoto et al. | 340/5.62 |
| 7,256,680 B2 * | 8/2007 | Konno et al. | 340/5.61 |
| 7,334,443 B2 * | 2/2008 | Meekma et al. | 70/278.7 |
| 7,395,634 B2 * | 7/2008 | Anderson et al. | 52/79.1 |
| 7,448,238 B2 * | 11/2008 | Shimura et al. | 70/252 |
| 2001/0034211 A1 * | 10/2001 | Kuroshima et al. | 455/90 |
| 2003/0089723 A1 * | 5/2003 | Funck | 220/581 |
| 2003/0159481 A1 | 8/2003 | McGuire et al. | |
| 2004/0061660 A1 * | 4/2004 | Yoshida et al. | 343/788 |
| 2004/0069658 A1 * | 4/2004 | Jeschke | 206/37.1 |
| 2004/0155525 A1 * | 8/2004 | Ohtaki et al. | 307/10.5 |
| 2004/0185798 A1 * | 9/2004 | Ohtaki et al. | 455/90.3 |
| 2004/0201451 A1 * | 10/2004 | Sugimoto et al. | 340/5.62 |
| 2004/0201512 A1 * | 10/2004 | Sugimoto et al. | 341/176 |
| 2004/0206610 A1 * | 10/2004 | Hasegawa et al. | 200/10 |
| 2004/0230348 A1 * | 11/2004 | Mann et al. | 701/1 |
| 2004/0237613 A1 * | 12/2004 | Shimura et al. | 70/456 R |
| 2005/0136852 A1 * | 6/2005 | Nakagawa et al. | 455/90.3 |
| 2005/0166650 A1 * | 8/2005 | Shimura et al. | 70/252 |
| 2006/0245170 A1 * | 11/2006 | Sugimoto et al. | 361/740 |
| 2006/0246851 A1 * | 11/2006 | Sugimoto et al. | 455/90.3 |
| 2007/0237940 A1 * | 10/2007 | Branca | 428/297.4 |
| 2009/0045051 A1 * | 2/2009 | Ferrasse et al. | 204/298.13 |

FOREIGN PATENT DOCUMENTS

| | | |
|---|---|---|
| DE | 42 38 042 | 5/1994 |
| DE | 196 38 364 | 5/1998 |
| DE | 102 14 025 | 10/2003 |
| JP | 10-30746 | 2/1998 |
| JP | 10-264211 | 10/1998 |
| JP | 11-91510 | 4/1999 |
| JP | 2001-301532 | 10/2001 |
| JP | 2004-52471 | 2/2004 |
| JP | 2004-134835 | 4/2004 |
| JP | 2004-263384 | 9/2004 |

OTHER PUBLICATIONS

U.S. Appl. No. 11/410,946 filed Apr. 26, 2006.
Chinese Office Action dated Apr. 3, 2009, issued in corresponding Chinese Application No. 2006100771442, with English translation.
Chinese office Action dated Sep. 4, 2009, issued in corresponding Chinese Application No. 200610077144.2, with English translation.

* cited by examiner

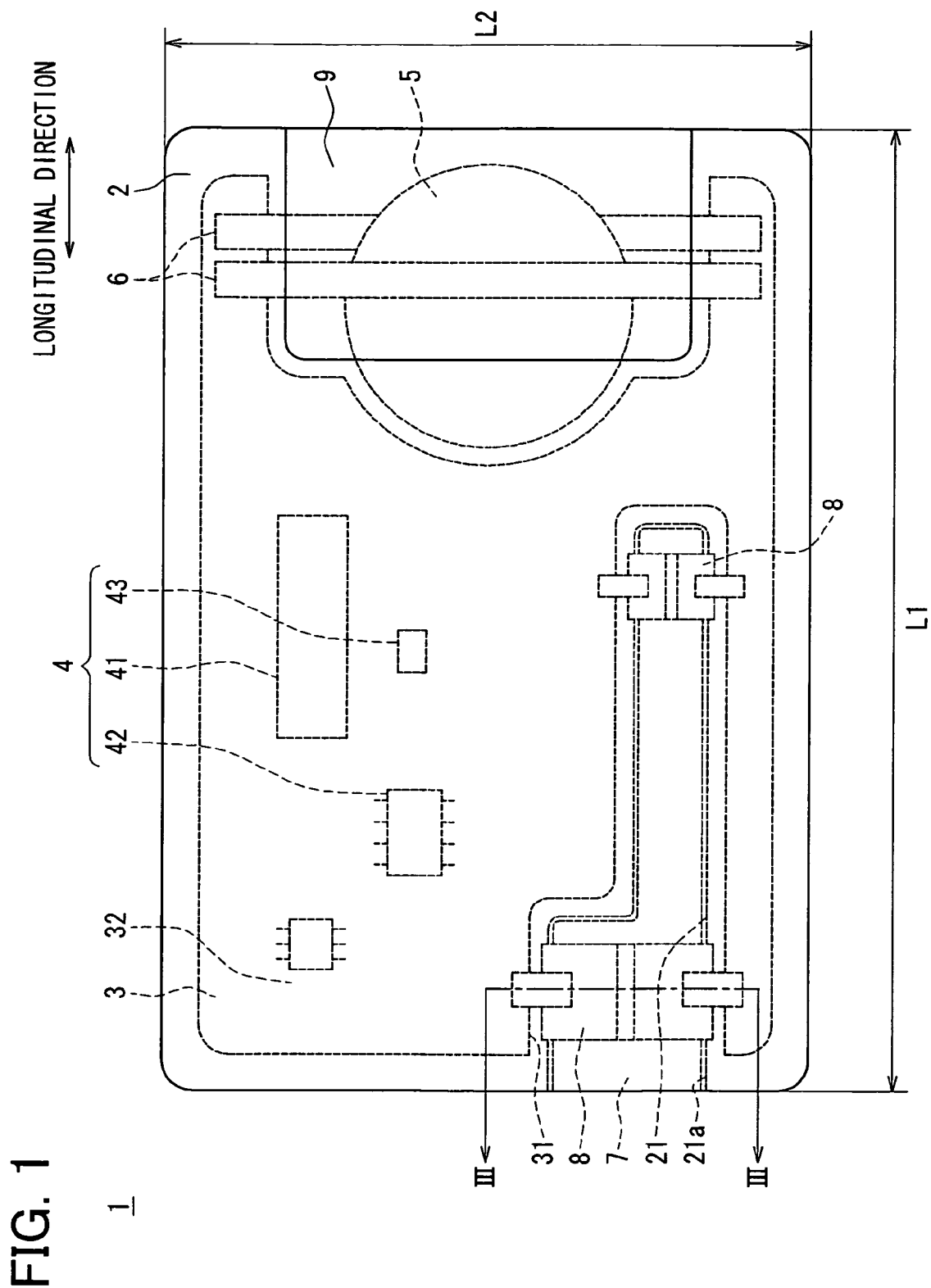

WIRELESS TRANSCEIVER AND METHOD FOR PRODUCING THE SAME

CROSS REFERENCE TO RELATED APPLICATION

This application is based on and claims the benefit of priority of Japanese Patent Application No. 2005-130273 filed on Apr. 27, 2005, the disclosure of which is incorporated herein by reference.

FIELD OF THE INVENTION

The present invention generally relates to a wireless key having a resin case for accepting a mechanical key.

BACKGROUND OF THE INVENTION

Conventionally, a wireless transceiver for use in a portable device of Smart Key system (registered trademark) is carried by a user, and communicates with a station disposed on a vehicle when the user enters into the vehicle. The transceiver in the portable device of the Smart Key system allows the user to unlock a door of the vehicle, to start an engine or to perform other operation when the transceiver is carried by the user.

The transceiver includes a circuit board for mounting circuit parts and a battery as a power source in a resin case. The transceiver also includes a mechanical key stored therein for use in an emergency such as battery rundown, breakdown on the transceiver, or the like. The mechanical key is accepted in a hollow space in the resin case. In case of an emergency, the user pulls out the mechanical key from the hollow space of the resin case, and uses the key for unlocking the door or for other purposes.

However, the transceiver uses a more complicated and sophisticated system that tends to use an increased number of parts, while a volume of the transceiver body is required to be much more smaller in order to be conveniently carried by the user. That is, the transceiver in a thin card shape is particularly preferred.

In this case, dimension of the mechanical key is approximately 2 mm in thickness, and this allows the resin case on both sides of the key (i.e., the portion around the hollow space) only to be in a thickness of 0.5 mm when a total thickness of the transceiver is 3 mm. Therefore, physical strength of the transceiver at the hollow space portion becomes not necessarily sufficient.

That is, the transceiver may be broken in case of falling from a certain height because of the insufficient strength of the hollow space portion for an impact caused by the weight of the mechanical key (approximately 5 gram).

This kind of problem is commonly found in the transceiver for use in other type of keys, such as a key for opening/closing an office door, a key for operating a testing device or the like beside the transceiver for the Smart Key system.

SUMMARY OF THE INVENTION

In view of the above-described and other problems, the present invention provides a wireless transceiver that provides a sufficient strength of a resin case at a position of a hollow space that accepts a mechanical key intended to be used in an emergency.

The wireless transceiver includes the mechanical key, the resin case having the hollow space that accepts the mechanical key, and a metal plate for reinforcing the resin case. The hollow space is defined by a combination of a thin wall and a thick wall, and the resin case has the metal plates for reinforcing the thin wall and the thick wall of the hollow space at two positions spaced by a predetermined length along a longitudinal direction of the mechanical key being accepted therein.

The thin wall and the thick wall of the resin case are reinforced by the thin metal plate that extends over these walls. The metal plate reinforces the resin case at two positions spaced by a predetermined length in a longitudinal direction of the mechanical key. The metal plate is either fixed on the resin case, or embedded in the resin case. In this manner, the thin wall of the resin case is reinforced at the two positions directly by the metal plate and remotely by the thick wall in association with the metal plate.

The mechanical key is supported at two positions by the thin wall of the hollow space. As a result, strength of the resin case for supporting the mechanical key is increased at the position of the hollow space.

In another aspect of the present invention, the wireless transceiver has at least one reinforcement (the thin metal plate) that substantially surrounds the mechanical key in the hollow space. In this manner, the thin wall is reinforced directly by the reinforcement and remotely by the thick wall because of a shape of the reinforcement that substantially surrounds the mechanical key in the hollow space. As a result, strength of the resin case at the position of the hollow space is increased.

In yet another aspect of the present invention, the wireless transceiver has the reinforcement that extends to cover the two positions in the resin case. In this manner, the reinforcement covers the two positions and a portion interposed therebetween by one piece, thereby reinforcing the thin wall of the resin case at the corresponding positions. The thin wall is further reinforced by the thick wall in association with the reinforcement. As a result, strength of the resin case at the position of the hollow space is further increased.

In still yet another aspect of the present invention, the wireless transceiver includes the two positions in the proximity of two longitudinal ends of the mechanical key respectively. In this manner, the mechanical key is supported by the thin wall at the two positions in the proximity of the longitudinal ends in the hollow space. As a result, strength of the resin case at those positions is further increased.

In still yet another aspect of the present invention, the wireless transceiver is produced by molding the resin case for having the hollow space, and by either fixing or embedding the reinforcement on the resin case. In this manner, the reinforcement is fixed or embedded on the resin case in the course of production, thereby achieving reinforcement effect more easily.

In still yet another aspect of the present invention, the wireless transceiver includes a circuit board for mounting a circuit part, and the reinforcement has a fixing portion to be soldered on the circuit board. In this manner, the thin wall in association with the circuit board is reinforced because of the fixing portion of the reinforcement soldered on the circuit board. As a result, strength of the resin case is further increased at the position of the hollow space for accepting the mechanical key.

In still yet another aspect of the present invention, the wireless transceiver is produced by soldering the fixing portion of the reinforcement on the circuit board before forming the resin case by molding. The resin case seals at least a mount surface of the circuit board in a process of molding. The mount surface used to mount the circuit part. In this manner, the reinforcement of the resin case is easily achieved and the circuit part is sealed at the same time.

In still yet another aspect of the present invention, the wireless transceiver has the resin case that is made with a thermosetting resin, and a melting point of solder used to solder the circuit part and the fixing portion is higher than a molding temperature of the resin case.

Heat resistance of the resin case decreases when the resin case is made with, for example, the thermoplastic resin because the melting temperature of the thermoplastic resin has to be lower than the melting point of the solder.

In the present invention, the solder for the circuit part and the solder for the fixing portion have a melting point that is higher than the molding temperature of the resin case that is made with the thermosetting resin. In this manner, the thermosetting resin is hardened at a lower temperature than the melting point of the solder. Further, choice of the resin type is widened in terms of the heat resistance. As a result, the resin case of the wireless transceiver is effectively reinforced to have robustness.

BRIEF DESCRIPTION OF THE DRAWINGS

Other objects, features and advantages of the present invention will become more apparent from the following detailed description made with reference to the accompanying drawings, in which:

FIG. 1 shows a plan view of a wireless transceiver in a first embodiment of the present invention;

DETAILED DESCRIPTION OF THE PREFERRED EMBODIMENTS

Preferred embodiments of the present invention are described with reference to the drawings. A wireless transceiver of the present invention is used in Smart Key system (registered trademark).

First Embodiment

FIG. 1 shows a plan view of a wireless transceiver 1 in a first embodiment of the present invention.

Figure 2A:
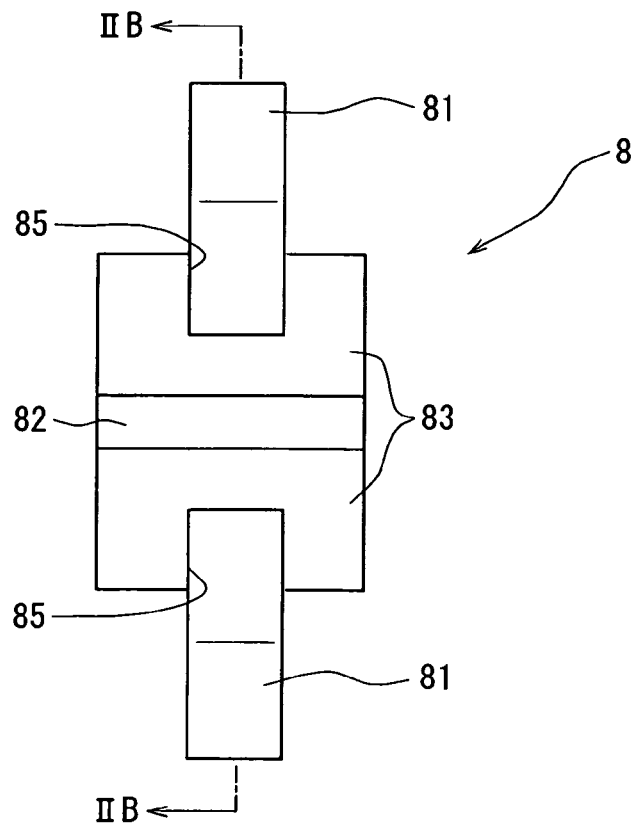
FIG. 2A shows a plan view of a holder in the first embodiment in FIG. 1.
Figure 2B:
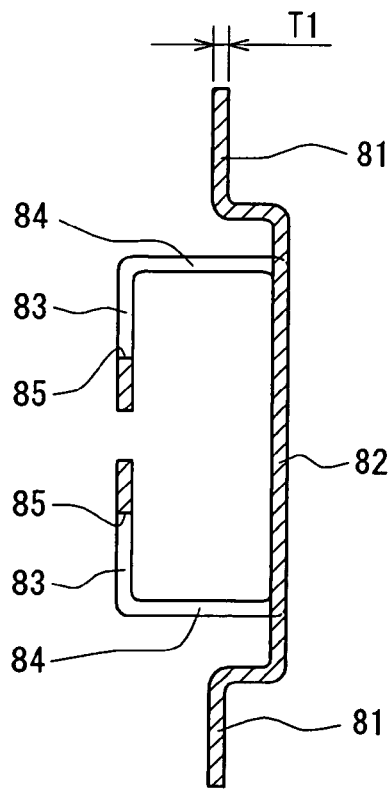
FIG. 2B shows a cross-sectional view of the holder along IIB-IIB line in FIG. 2A.

FIG. 2A shows a plan view of a holder 8 in the first embodiment in FIG. 1. The holder 8 is used as a reinforcement member. FIG. 2B shows a cross-sectional view of the holder 8 along IIB-IIB line in FIG. 2A.

Figure 3:
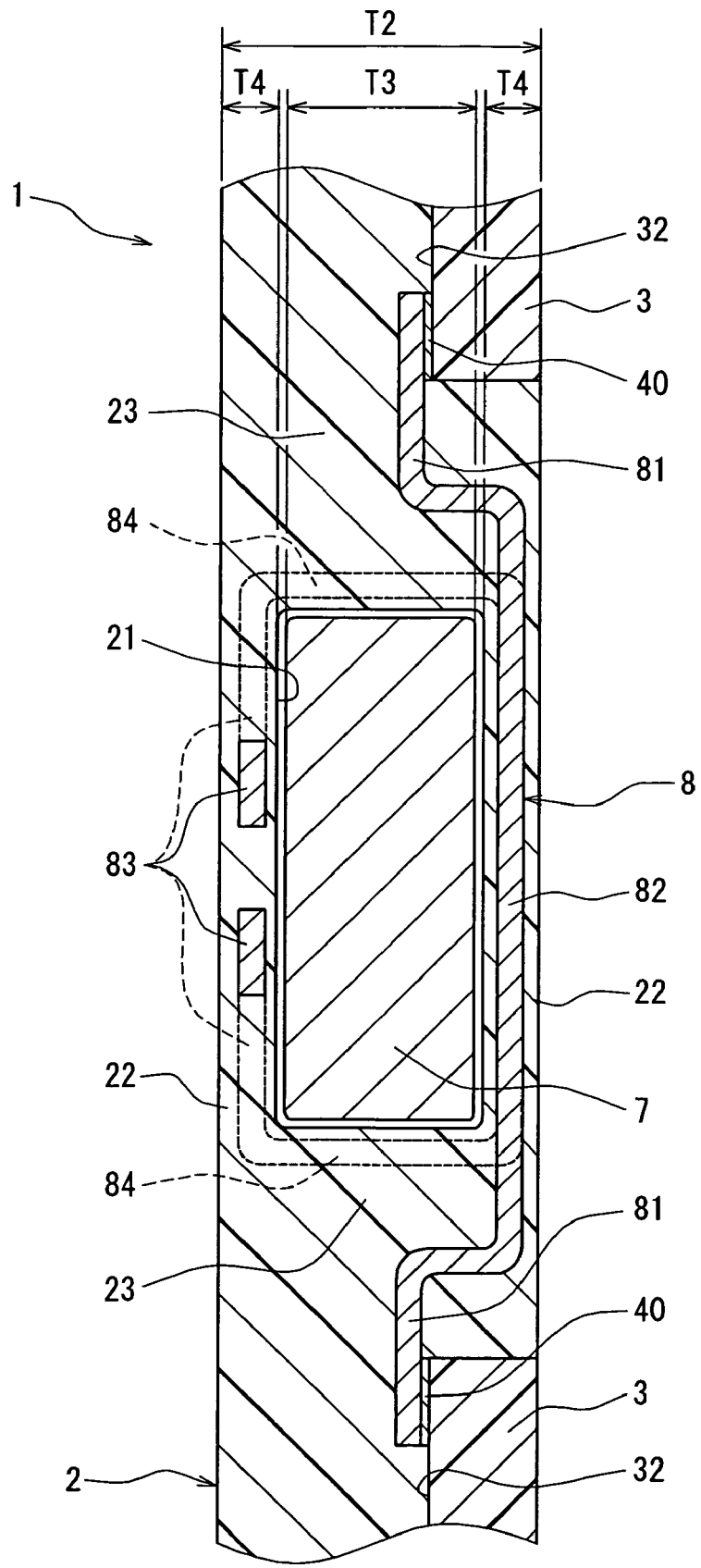
FIG. 3 shows a cross-sectional view of a portion of the transceiver along III-III line in FIG. 1.

FIG. 3 shows a cross-sectional view of a portion of the wireless transceiver 1 along III-III line in FIG. 1.

The Smart Key system allows a user (a driver) to lock/unlock a door of a vehicle, to start an engine of the vehicle, or to perform other operation when the driver merely carries the transceiver 1.

The transceiver 1 includes a resin case 2, a circuit board 3, circuit parts 4, a battery 5, a terminal 6, a mechanical key 7, and a battery cover 9. The circuit parts 4 are mounted on the circuit board 3. The battery 5 is used as a power source. The terminal 6 electrically connects the circuit parts 4 and the battery 5 on the circuit board 3. The circuit board 3, the circuit parts 4, the battery 5, the terminal 6 and the mechanical key 7 are disposed inside of the resin case 2 and the battery cover 9.

The circuit board 3 is a circuit board that has a conductor pattern only on one side. The side of the circuit board 3 having the conductor pattern is a mounting surface 32. The mounting surface 32 has the circuit parts 4 mounted thereon. The circuit parts 4 transmits a response signal in response to a request signal when the transceiver 1 receives the request signal for recognition code (ID code) from the vehicle. The circuit parts 4 includes an antenna 41, a packaged integrated circuit (a packaged IC) 42 and other electronic part 43.

The mechanical key 7 is an emergency key for use in an emergency such as exhaustion of the battery 5, breakdown of the transceiver 1 or the like. The key 7 is stored in a hollow space 21 in the resin case 2. The hollow space 21 has an opening 21a, and the key 7 is inserted into the hollow space 21 through the opening 21a. The circuit board 3 has a concave portion 31 for allowing the hollow space 21 to be disposed in the resin case 2.

In case of exhaustion of the battery 5, breakdown of the transceiver 1 or similar situation, the mechanical key 7 is pulled out from the hollow space 21, and is used to unlock the door or to perform other operation.

The holder 8 as a reinforcement member is fixed on the resin case 2 in the proximity of longitudinal ends of the mechanical key 7 stored in the hollow space 21. That is, the holder 8 is fixed to the resin case 2 at the proximity of the longitudinal ends of the hollow space 21. The longitudinal direction is shown by a two-headed arrow in FIG. 1. The two holders 8 are basically in a same shape at both ends, and are different in size. Material of the holder 8 is phosphor bronze in a thin plate shape. The phosphor bronze is an alloy that mainly contains cupper and tin to have an increased strength with an acceptance of solder.

The holder 8 is punched out from a thin plate of the phosphor bronze, and is bent to have a required shape as shown in FIG. 2. Dimension of the phosphor bronze plate is 0.3 mm in thickness. More practically, the holder 8 has a fixing portion 81, a first reinforcement portion 82, a second reinforcement portion 83 and a support portion 84. The support portion 84 is bent to be raised from the first reinforcement portion 82. The fixing portion 81 is separately bent substantially in an opposite direction relative to the second reinforcement portion 83 bent from the support portion 84, thereby leaving a hole portion 85 in the second reinforcement portion 83 and the support portion 84.

The holder 8 is fixed on the mounting surface 32 of the circuit board 3 by soldering the fixing portion 81 with solder 40. The holder 8 is formed to accept a surface mount device (SMD), and is automatically mounted on the mounting surface 32 with the circuit parts 4 as shown in FIGS. 1 and 3.

The resin case 2 is molded after soldering the holder 8 and the circuit parts 4 on the circuit board 3 for sealing the soldered components as shown in FIG. 3. That is, the mounting surface 32 of the circuit board 3 including the circuit parts 4 and a side face of the circuit board 3 having the holder 8 soldered thereto are sealed by the resin case 2. In this manner, the circuit parts 4 are sealed from water, and the circuit board 3 and the holder 8 are fixed in the resin case 2.

The holder 8 and the circuit parts 4 are soldered before molding the resin case 2. Therefore, a melting point of the solder for soldering the circuit parts 4 must be higher than the molding temperature. In this case, for example, thermoplastic resin used to form the resin case 2 must have a molding temperature that is lower than the melting point of the solder for the circuit parts 4, thereby decreasing heat resistance of the resin case 2.

On the other hand, the resin case 2 formed with thermosetting resin can be molded under the melting point of the solder. Therefore, the thermosetting resin having high heat resistance is used to form the resin case 2. In this case, for example, the solder has the melting point of 200 to 300 degrees of Celsius, and an epoxy type thermosetting resin having the molding temperature of 170 degrees of Celsius is used to mold the transceiver 1.

The user of the Smart Key system carries the transceiver 1 when he/she drives the vehicle, and the transceiver may preferably be stored in a card compartment of a wallet for portability. Therefore, the resin case 2 is formed substantially in a card shape, and dimension of the card shape is substantially set to comply with a ID-1 type card standard, that is, a dimension L1 is approximately 83 mm, a dimension L2 is approximately 58 mm, and a dimension T2 of thickness is approximately 3 mm as shown in FIG. 3.

A thickness T3 of the mechanical key 7 is approximately 1.8 mm as shown in FIG. 3. Therefore, a thickness T4 left for a thin wall 22 of the hollow space 21 is approximately 0.5 mm. The hollow space 21 is surrounded by the thin wall 22 and a thick wall 23 in the resin case 2.

The first reinforcement portion 82 and the second reinforcement portion 83 are disposed inside of the thin wall 22 of the resin case 2. The support portion 84 of the holder 8 is disposed inside the thick wall 23 of the resin case 2. That is, the holder 8 having the first reinforcement portion 82 and the support portion 84 in connection with the second reinforcement portion 83 is integrally embedded in the thin wall 22 and in the thick wall 23 of the resin case 2.

In this manner, the thin wall 22 of the resin case 2 is reinforced by the first reinforcement portion 82 and the second reinforcement portion 83 of the holder 8, and is further reinforced by the thick wall 23 of the resin case 2 because the thick wall 23 supported by the support portion 84 is connected to the thin wall 22. Therefore, strength of the thin wall 22 is increased.

The holder 8 has a shape that substantially surrounds the mechanical key 7 in the hollow space 21. In this manner, the thin wall 22 of the resin case 2 effectively receives support from the thick wall 23 in association with the holder 8 in addition to support from the holder 8 itself. Therefore, strength of the resin case 2 at the position of the hollow space 21 for storing the mechanical key 7 is increased.

Further, the fixing portion 81 of the holder 8 is fixed on the circuit board 3 that is molded in the resin case 2, and the holder 8 is disposed at the proximity of each of both ends of the mechanical key 7 in the hollow space 21. In this manner, the weight of the mechanical key 7 (approximately 5 gram) is dispersed to the circuit board 3 and the longitudinal end positions of the hollow space 21.

As a result, the resin case 2 is prevented from breaking at the position of the hollow space 21 by the impact of the weight (i.e., approx. 5 gram) of the mechanical key 7 in case of falling.

The wireless transceiver 1 in the first embodiment of the present invention includes the mechanical key 7, the resin case 2 having the hollow space 21 that accepts the mechanical key 7 and a reinforcement for reinforcing the resin case 2. The hollow space 21 defined by a combination of the thin wall 22 and the thick wall 23 has reinforcement of thin metal plate for the thin wall 22 and the thick wall 23 at two positions spaced by a predetermined length along a longitudinal direction of the mechanical key 7. The reinforcement is provided by the holders 8 embedded in the resin case 2 for integrally supporting the thin wall 22 and the thick wall 23. The holder 8 is formed in the shape that substantially surrounds the mechanical key 7 in the hollow space 21 with the fixing portion 81 to be soldered on the circuit board 3.

In this manner, the thin wall 22 is reinforced by the holder 8 at the proximity of the two longitudinal ends of the mechanical key 7 as well as receiving support from the thick wall 23 that is integrated to the thin wall 22 by the holder 8 for having an improved strength.

Further, the weight of the mechanical key 7 is dispersed to the circuit board 3, and is supported by the thin wall 22 at the two longitudinal ends of the hollow space 21. As a result, the resin case 2 provides sufficient strength for supporting the mechanical key 7 at the position of the hollow space 21 that stores the mechanical key 7.

Second Embodiment

Figure 4:
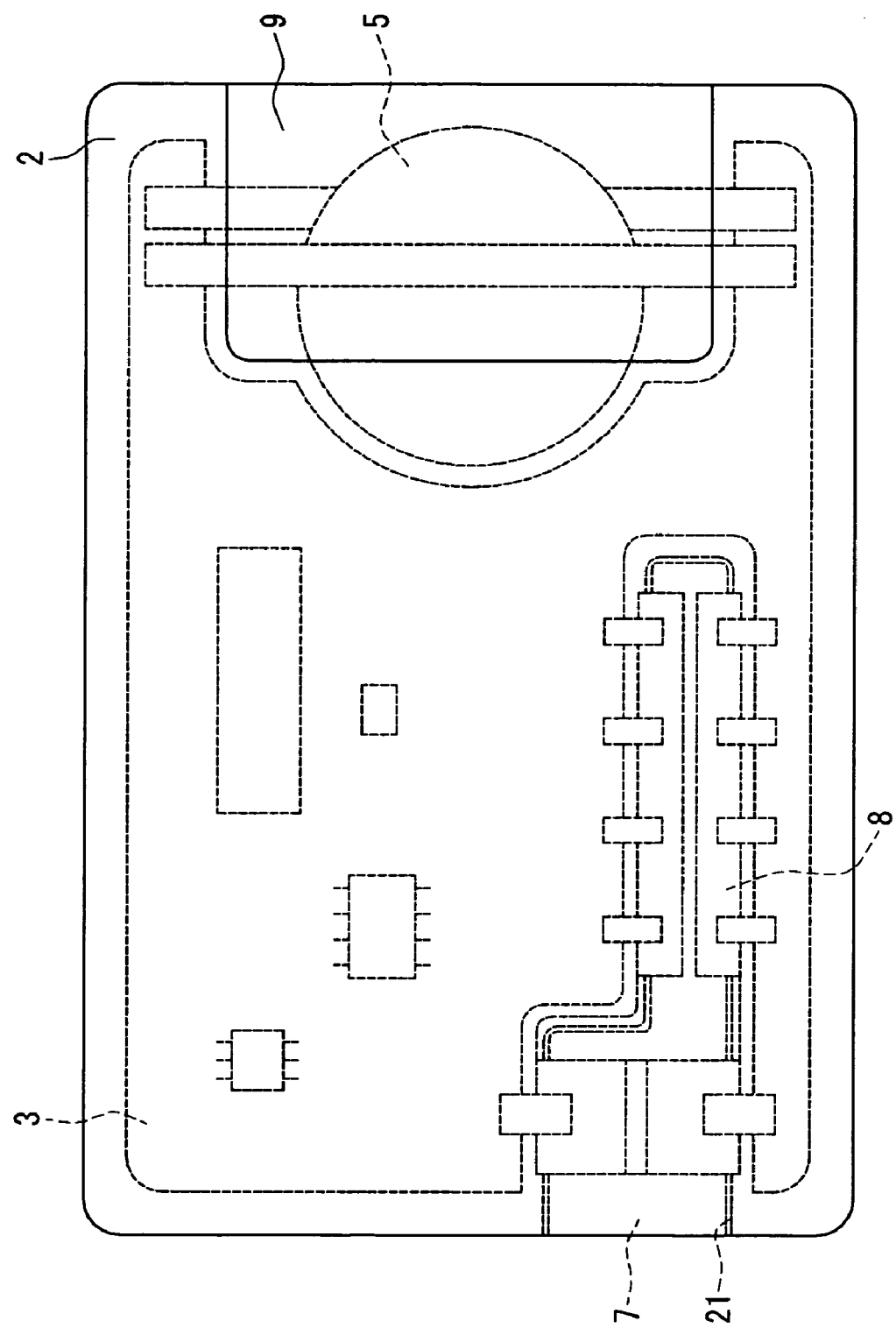
FIG. 4 shows a plan view of the wireless transceiver in a second embodiment of the present invention.

FIG. 4 shows a plan view of the wireless transceiver 1 in a second embodiment of the present invention.

Figure 5A:
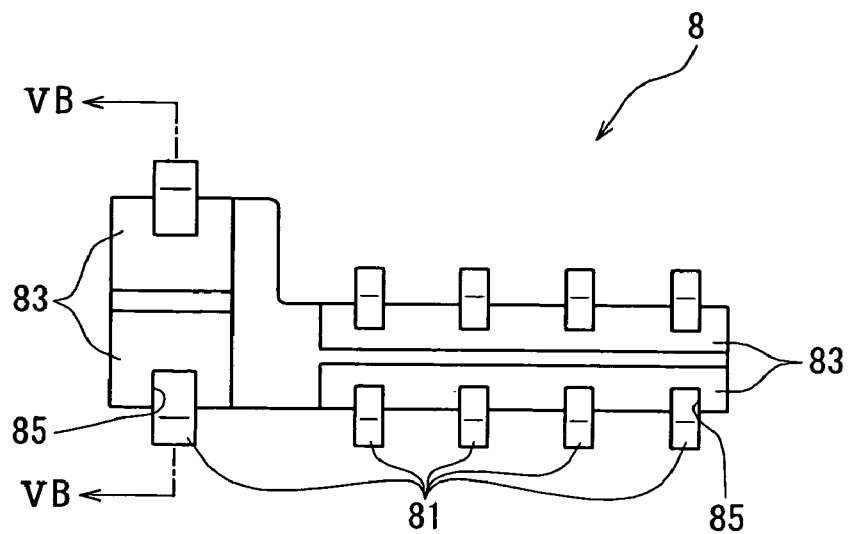
FIG. 5A shows a plan view of the holder shown in FIG. 4 in the second embodiment.
Figure 5B:
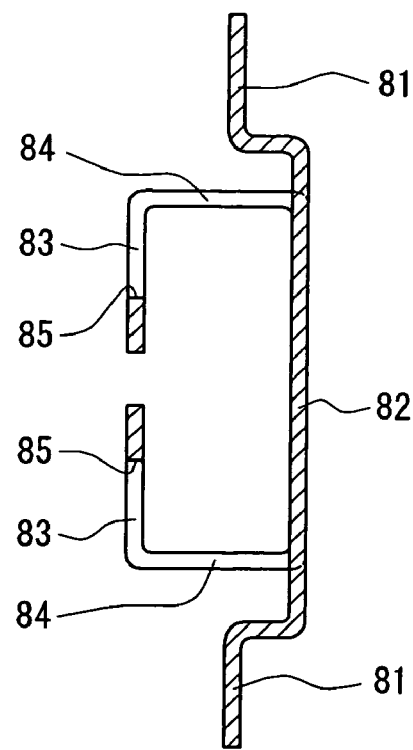
FIG. 5B shows a cross-sectional view of the holder along VB-VB line in FIG. 5A.

FIG. 5A shows a plan view of the holder shown in FIG. 4 in the second embodiment, and FIG. 5B shows a cross-sectional view of the holder along VB-VB line in FIG. 5A.

The wireless transceiver 1 in the second embodiment of the present invention has an integrated shape holder 8 for supporting the mechanical key 7 in the hollow space 21. That is, the resin case is reinforced at the position of the hollow space 21 longitudinally by the holder 8 made as a single piece. The holder 8 substantially extends from one end of the mechanical key 7 to the other end. The fixing portion 81 is added in a portion between two longitudinal ends of the holder 8.

In this manner, the thin wall 22 of the resin case 2 is reinforced by the holder 8 at the portion between the two longitudinal ends and is reinforced by the thick wall 23 in association with the holder 8. Further, the weight of the mechanical key 7 is dispersed to be borne by the circuit board 3. As a result, strength of the resin case 2 for supporting the mechanical key 7 is increased at the position of the hollow space 21.

Although the present invention has been fully described in connection with the preferred embodiment thereof with reference to the accompanying drawings, it is to be noted that various changes and modifications will become apparent to those skilled in the art.

For example, the holder 8 may be positioned at two positions other than the two longitudinal ends of the mechanical key 7.

Further, the holder 8 may be made with a thin metal plate with or without plating other than the phosphor bronze as long as the metal plate accepts the solder.

Furthermore, the holder 8 may be in a shape having no fixing portion 81. That is, the holder 8 may be used without soldering on the circuit board 3. In this case, the holder 8 may be formed with the metal plate such as aluminum, stainless steel or the like that does not accept the solder.

Furthermore, the holder 8 may be disposed on an inside surface of the hollow space 21. That is, the holder 8 may be exposed from the resin case in the hollow space 21.

Furthermore, the circuit board 3 may have the conductor pattern on both sides. In this case, the mounting surface 32 on both sides of the circuit board 3 are sealed by the resin case 2.

Furthermore, the wireless transmitter 1 of the present invention may be used in a system for office doors operation, testing device operation or the like as well as the Smart Key system in the vehicle.

In other words, the wireless transmitter of the present invention may be used in a system as long as the system allows the transmitter to have above-described feature of the present invention.

Such changes and modifications are to be understood as being within the scope of the present invention as defined by the appended claims.

What is claimed is:

1. A wireless transceiver comprising:
a mechanical key;
a resin case having a hollow space that accepts the mechanical key; and
a holder for reinforcing the resin case,
wherein the hollow space is defined by a combination of a thin wall and a thick wall, the holder comprises two reinforcements, each made from a thin metal plate and at least partly encircling the hollow space, respectively at two positions spaced by a predetermined length along a longitudinal direction of the mechanical key being accepted therein,
each of the reinforcements bridges the thin wall and the thick wall that is adjacent to the thin wall, and
each said reinforcement is embedded in the resin case.

2. The wireless transceiver according to claim 1,
wherein at least one of the two reinforcements substantially surrounds the mechanical key accepted in the hollow space.

3. The wireless transceiver according to claim 1,
wherein the holder extends to cover the two positions in the resin case.

4. The wireless transceiver according to claim 1,
wherein the two positions exist in a proximity of two longitudinal ends of the mechanical key respectively.

5. A method of producing the wireless transceiver according to claim 1 comprising a step of:
molding the resin case so as to define the hollow space, and
wherein the disposition method of the holder in the resin case is embedding, so that the holder is encapsulated in the molded resin case.

6. A wireless transceiver comprising:
a mechanical key;
a resin case having a hollow space that accepts the mechanical key;
a holder for reinforcing the resin case; and
a circuit board for mounting a circuit part,
wherein the hollow space is defined by a combination of a thin wall and a thick wall, the holder comprises two reinforcements, each made from a thin metal plate and at least partly encircling the hollow space, respectively at two positions spaced by a predetermined length along a longitudinal direction of the mechanical key being accepted therein,
each of the reinforcements bridges the thin wall and the thick wall that is adjacent to the thin wall, and
wherein the holder includes a fixing portion soldered on the circuit board.

7. A method of producing the wireless transceiver according to claim 6 comprising steps of:
soldering the fixing portion of the holder on the circuit board; and molding the resin case,
wherein the circuit board includes a mount surface for mounting the circuit part, and the resin case seals at least the mount surface of the circuit board in a process of molding.

8. A method of producing the wireless transceiver according to claim 7,
wherein the resin case is made from a thermosetting resin, and
a melting point of solder used to solder the circuit part on the circuit board and a melting point of solder used to solder the fixing portion on the circuit board are higher than a molding temperature of the resin case.

9. A method of producing the wireless transceiver according to claim 6 comprising a step of:
molding the resin case so as to define the hollow space, and
wherein the disposition method of the holder in the resin case is embedding, so that the holder is encapsulated in the molded resin case.

10. A wireless transceiver, which receives circuit parts, a battery and a mechanical key therein, the transceiver comprising:
a resin case having a hollow space to removably accept the mechanical key, the hollow space being shaped to extend in a longitudinal direction in which the mechanical key is movable and defined by a pair of thin walls facing each other and a pair of thick walls facing each other between the pair of thin walls; and
a plurality of reinforcements embedded in the resin case adjacent at least two longitudinal ends of the hollow space to removably accept the mechanical key, each reinforcement being made of a thin metal plate and shaped to extend through the pair of thin walls and the pair of thick walls to substantially surround the hollow space and to substantially surround the mechanical key disposed therein.

11. The transceiver of claim 10, wherein
each of the plurality of reinforcements is formed of a single piece including a part that extends in the longitudinal direction in one of the pair of thin walls, the single piece further including a fixing part and a supporting part embedded in each of the pair of thick walls at an outside of the hollow space and extending from the part embedded in the one of thin walls in different directions that are perpendicular to each other.

12. The transceiver of claim 11 further comprising:
a circuit board mounting the circuit parts thereon and embedded in the resin case, wherein
the fixing part in each of the pair of thick walls is fixed to the circuit board.

* * * * *